US011593769B2

(12) United States Patent
Khan et al.

(10) Patent No.: US 11,593,769 B2
(45) Date of Patent: *Feb. 28, 2023

(54) TASK IDENTIFICATION FROM ELECTRONIC USER COMMUNICATIONS USING A SHARED CONVERSATIONAL CONTEXT

(71) Applicant: MICROSOFT TECHNOLOGY LICENSING, LLC, Redmond, WA (US)

(72) Inventors: Omar Zia Khan, Bellevue, WA (US); Vipul Agarwal, Bellevue, WA (US); Imed Zitouni, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,200

(22) Filed: Jun. 5, 2020

(65) Prior Publication Data

US 2020/0302405 A1    Sep. 24, 2020

Related U.S. Application Data

(63) Continuation of application No. 15/605,555, filed on May 25, 2017, now Pat. No. 10,679,192.

(51) Int. Cl.
*G06Q 10/10*    (2012.01)
*H04L 51/04*    (2022.01)
(Continued)

(52) U.S. Cl.
CPC ......... *G06Q 10/1097* (2013.01); *H04L 51/02* (2013.01); *H04L 51/04* (2013.01);
(Continued)

(58) Field of Classification Search
CPC ......... G06Q 10/1097; G06Q 10/06311; G06Q 10/063114; H04L 51/16; H04L 51/34;
(Continued)

(56) References Cited

U.S. PATENT DOCUMENTS 8,639,552 B1 * 1/2014 Chen ................ G06Q 10/06311
705/7.21
9,143,468 B1 * 9/2015 Cohen ..................... H04L 51/32
(Continued)

FOREIGN PATENT DOCUMENTS

CN    102737104 A    10/2012
CN    104813311 A    7/2015
(Continued)

OTHER PUBLICATIONS

"Office Action Issued in European Patent Application No. 18730143.7", dated Apr. 22, 2021, 9 Pages.
(Continued)

*Primary Examiner* — Scott L Jarrett
(74) *Attorney, Agent, or Firm* — Shook, Hardy & Bacon, LLP (57) ABSTRACT

Systems and methods are disclosed for task identification and tracking using shared conversational context. In one implementation, a first communication from a first user is received within a communication session. The first communication is processed to identify a first content element within the first communication. A second communication is received within the communication session. The second communication is processed to identify a second content element within the second communication. The first content element is associated with the second content element. Based on an association between the first content element and the second content element, a task is identified. An action is initiated with respect to the task.

20 Claims, 6 Drawing Sheets

(51) Int. Cl.
*H04L 51/02* (2022.01)
*H04L 51/216* (2022.01)
*H04W 4/12* (2009.01)
*G06Q 30/06* (2012.01)
*G06F 3/0482* (2013.01)
*H04L 51/224* (2022.01)
*H04L 51/234* (2022.01)
*G06Q 10/1093* (2023.01)
*G06Q 30/0601* (2023.01)

(52) U.S. Cl.
CPC .......... *H04L 51/216* (2022.05); *G06F 3/0482* (2013.01); *G06Q 30/0633* (2013.01); *H04L 51/224* (2022.05); *H04L 51/234* (2022.05); *H04W 4/12* (2013.01)

(58) Field of Classification Search
CPC ......... H04L 51/04; H04L 51/18; H04L 67/22; G06F 3/0482
See application file for complete search history.

(56) References Cited

U.S. PATENT DOCUMENTS

| | | | | |
|---|---|---|---|---|
| 9,374,327 | B2* | 6/2016 | Rao DV | H04L 12/1827 |
| 10,140,291 | B2* | 11/2018 | Brunn | G06F 40/279 |
| 10,528,228 | B2* | 1/2020 | Seixeiro | H04L 67/306 |
| 10,679,192 | B2* | 6/2020 | Khan | G06Q 10/1097 |
| 2009/0235280 | A1* | 9/2009 | Tannier | G06Q 10/00 719/318 |
| 2012/0245944 | A1* | 9/2012 | Gruber | G10L 13/08 704/270.1 |
| 2014/0214404 | A1* | 7/2014 | Kalia | G06F 40/40 704/9 |
| 2016/0203002 | A1* | 7/2016 | Kannan | G06F 9/453 715/708 |
| 2016/0337295 | A1* | 11/2016 | Bennett | H04L 51/046 |
| 2017/0017519 | A1* | 1/2017 | Khan | H04L 51/02 |
| 2017/0099249 | A1* | 4/2017 | Kozareva | G06F 16/353 |
| 2017/0134316 | A1* | 5/2017 | Cohen | H04L 51/12 |

FOREIGN PATENT DOCUMENTS

| | | |
|---|---|---|
| CN | 104951433 A | 9/2015 |
| WO | 2017078792 A1 | 5/2017 |

OTHER PUBLICATIONS

"First Office Action and Search Report Issued in Chinese Patent Application No. 201880034516.4", dated May 8, 2021, 21 Pages.
"Office Action Issued in Chinese Patent Application No. 201880034516.4", dated Jul. 5, 2022, 11 Pages.

* cited by examiner

TASK IDENTIFICATION FROM ELECTRONIC USER COMMUNICATIONS USING A SHARED CONVERSATIONAL CONTEXT

CROSS-REFERENCE TO RELATED APPLICATIONS

This application is a continuation of U.S. application Ser. No. 15/605,555, titled "Task Identification and Tracking Using Shared Conversational Context," filed on May 25, 2017, which is incorporated herein in its entirety by reference.

TECHNICAL FIELD

Aspects and implementations of the present disclosure relate to data processing and, more specifically, but without limitation, to task identification and tracking using shared conversational context.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, Systems and methods are disclosed for task identification and tracking using shared conversational context. In one implementation, a first communication from a first user is received within a communication session. The first communication is processed to identify a first content element within the first communication. A second communication is received within the communication session. The second communication is processed to identify a second content element within the second communication. The first content element is associated with the second content element. Based on an association between the first content element and the second content element, a task is identified. An action is initiated with respect to the task.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to task identification and tracking using shared conversational context.

Various messaging applications/platforms enable users to communicate with one another by sending/receiving messages and other content. Additionally, intelligent personal assistants and related technologies can provide users with related information within messaging/conversational interfaces. However, existing technologies do not integrate the use of such personal assistants within multi-party conversations. Specifically, existing technologies cannot accurately identify the context of a multi-party conversation, and thus often cannot accurately identify content being discussed/referenced within the conversation. As a result, personal assistants are frequently ineffective in enabling participants in a conversation to complete tasks that are being discussed.

Accordingly, described herein in various implementations are technologies, including methods, machine readable mediums, and systems, that enable task identification and tracking using shared conversational context. For example, the described technologies can process multiple communication(s) originating from multiple users within a conversation. Content element(s) (e.g., entities, actions, etc.) can be identified and used to generate a knowledge base that reflects a conversational context that is shared between the users. Subsequent communications within the conversation can be processed in view of the referenced knowledge base, thereby leveraging/accounting for the conversational context when processing such communication(s). In doing so, content elements referenced within a conversation (and/or their relevance, significance, etc.) can be more accurately identified (e.g., based on a shared context for the referenced conversation, as reflected in the knowledge graph).

Additionally, using the referenced conversational context, various tasks (such as those discussed among the participants in a conversation) can be identified and the completion of such tasks can be facilitated and/or tracked. For example, having identified a task within a conversation, such a task can be assigned to one of the participants. Additionally, various selectable controls, links, etc., can be provided to facilitate the completion of the task. Notifications can also be provided to notify users of the status of the completion of the task. In certain implementations, based on subsequent communications the task can be reassigned (e.g., to another user), as described herein. In doing so, the described technologies enable content elements to be more accurately identified within the context of a conversation and related tasks to be more effectively completed.

It can therefore be appreciated that the described technologies are directed to and address specific technical challenges and longstanding deficiencies in multiple technical areas, including but not limited to communication interfaces, conversational contexts, and intelligent personal assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
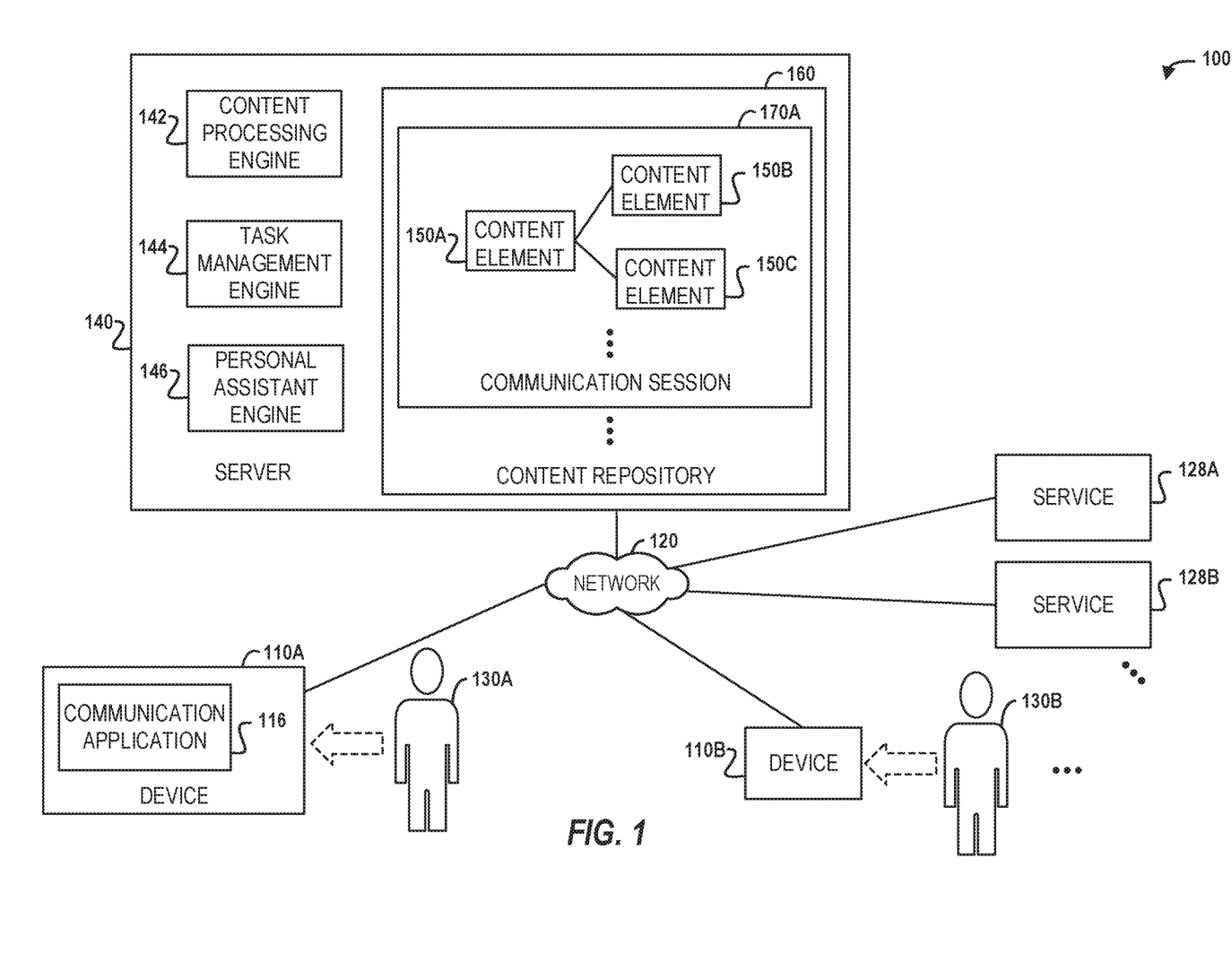
FIG. 1 illustrates an example system, in accordance with an example embodiment.

FIG. 1 illustrates an example system 100, in accordance with some implementations. As shown, the system 100 includes various devices such as device 110A and device 110B (collectively device(s) 110). Each device 110 can be a laptop computer, a desktop computer, a terminal, a mobile phone, a tablet computer, a smart watch, a wearable device, a personal digital assistant (PDA), a digital music player, a server, and the like. User 130A and User 130B (collectively user(s) 130) can each be a human user who interacts with a device 110 (e.g., device 110A and device 110B, respectively). For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110A can include applications, modules, etc., such as communication application 116. Such applications can be stored in memory of the device and, when executed (e.g., by a processor), can configure the device to perform various operations (such as those described herein). Communication application 116 can be an application that configures/enables the device to generate, transmit, receive, and/or present various communications (e.g., messages, content, media, etc.), e.g., on behalf of user 130A. For example, communication application 116 can be a messaging application/interface, social media application, etc. through which user 130A can compose and transmit communications (e.g., messages) to other device(s)/user(s). Communication application 116 can also enable user 130A to receive and view other communications originating from other device(s)/user(s) (e.g., device 110B, associated with user 130B). Various communications between devices/users can occur during (and be associated with) a communication session. Such a communication session can be, for example, a conversation, series or sequence of communications, etc., between certain users. Such communications can occur within a defined chronological interval of one another (e.g., communications occurring within 24 hours of one another) and/or can pertain to a particular topic.

It should also be noted that while various components (e.g., communication application 116) are depicted and/or described as operating on a device 110A, this is only for the sake of clarity. However, in other implementations the referenced components (e.g., communication application 116) can also be implemented on other devices/machines. For example, in lieu of executing locally at device 110A, communication application 116 can be implemented remotely (e.g., on a server device or within a cloud service or framework).

As also shown in FIG. 1, devices 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include content processing engine 142, task management engine 144, personal assistant engine 146, and content repository 160.

Content processing engine 142 can be an application or module that configures/enables server 140 to perform various operations such as are described herein. For example, content processing engine 142 can configure or enable server 140 to create, maintain, access, and/or query content repository 160. Content repository 160 can be, for example, a knowledge base or conversational graph within which various content elements (e.g., content element 150A, content element 150B, etc.,—collectively content elements 150—as shown in FIG. 1) can be stored. Such content elements can be, for example, various intents, entities, and/or actions (and/or parameters/values of such elements), such as can be identified or extracted from communications, and/or other inputs. Such communications, etc., can be received from various users (e.g., user 130A and user 130B), such as during a conversation between the users.

In certain implementations, content repository 160 can store such content elements with respect to a communication session (e.g., communication session 170A, as shown). As noted above, such a communication session can be, for example, a conversation, series or sequence of communications, etc., between certain users. Such communications can occur within a defined chronological interval of one another and/or can pertain to a particular topic. As described herein, by storing content elements 150 with respect to a communication session, subsequent communications within such a session can be more accurately processed. For example, relationships between content elements within a conversation between users can reflect a shared conversational context for such users. Accordingly, subsequent communications between such users can be processed based on/in view of the referenced context. In doing so, for example, various references contained within such subsequent communication(s) can be more accurately identified (e.g., based on the referenced shared context), as described herein.

It should therefore be understood that, in certain implementations, content elements 150 (and relationships between them, etc.) associated with a particular communication session (e.g., communication session 170A) can pertain to and/or otherwise be associated with certain users (e.g., those users that are participants in the referenced communication session). Accordingly, the referenced content elements (which reflect, for example, a conversational context that is shared between such identified users) can be used to process subsequent communications between such users (e.g., within the same communication session). However, such content elements may not necessarily be relevant to processing communications between other users.

In certain implementations, content processing engine 142 can utilize an ontology, model, and/or schema to define and/or represent various aspects, features, attributes, etc. of the content elements 150, as well as relationships between respective content elements. By way of illustration, content processing engine 142 can receive various communications from device 110A (e.g., a message sent from user 130A to user 130B via a messaging application). Content processing engine 142 can process such communication(s) (e.g., using natural language processing and/or other such techniques) to parse the communication(s) and identify/extract content element(s) (e.g., entities, intents, actions, parameters, etc.) present within the received communication(s). The extracted content elements can then be stored within content repository 160 in accordance with the referenced ontology, model, and/or schema. Subsequent communications (e.g., a response from user 130B to user 130A within the same conversation) can be processed in a comparable manner. In doing so, content repository 160 can reflect a knowledge base that reflects a conversational context that is shared between the users within the referenced communication session. Subsequently, the content elements 150, relationships between them, etc., reflected in content repository 160 can be utilized (e.g., by content processing engine 142 and/or other applications/services) to identify/recall and provide associated/related content to the user(s), as described in detail herein. In doing so, content originating from multiple participants in a conversation can be leveraged to process a subsequent communication and/or provide personalized/relevant content and achieve additional efficiencies and advantages, as described herein.

Task management engine 144 can be an application or module that configures/enables server 140 to perform various operations such as are described herein. For example, task management engine 144 can configure or enable server 140 to assign various identified tasks, such as those identified with respect to the communications, conversations, etc. referenced above. Such tasks can be, for example, action items or other such activities that are to be performed or completed (e.g., by a user). For example, during a conversation a user can agree to perform a task, such as ordering food from a restaurant. Subsequently, such tasks can also be reassigned (e.g., in a scenario in which a user can no longer perform a previously assigned task), as described herein.

Additionally, in certain implementations task management engine 144 can facilitate and/or track the performance of such task(s). For example, once a task has been assigned to a user, various notifications, selectable controls (e.g., buttons, links, etc.) can be generated and provided to the assigned user. Such controls can, for example, include links such as 'deep links' through which a user can complete the referenced tasks (e.g., through another application, service, etc.). Additionally, in certain implementations the status/performance of a task can be tracked. For example, with respect to an 'order food' task assigned to a user, upon receiving confirmation (e.g., from a food delivery service) that a corresponding order has been placed, the task can be determined to be performed or completed by the user.

Personal assistant engine 146 can be an application or module that configures/enables the device to interact with, provide content to, and/or otherwise perform operations on behalf of a user (e.g., user 130A). For example, personal assistant engine 146 can receive communications and/or request(s) from user 130A and present/provide responses to such request(s) (e.g., within a conversational interface such as via communication application 116). In certain implementations, personal assistant engine 146 can also identify content that can be relevant to user 130A (e.g., based on a location of the user or other such context) and present such content to the user.

In various implementations, the described technologies may utilize or leverage various services such as service 128A and service 128B (collectively services 128), as shown in FIG. 1. Such services can be, for example, third-party services that the user may communicate/interact with (e.g., via communication application 116 or another application). For example, service 128A can be a restaurant/food delivery service that user 130A can communicate with via communication application 116 on device 110A (e.g., via an application programming interface (API) of service 128A). In doing so, a user can access such services in order to complete various tasks, such as those identified with respect to a communication session, as described herein. Additionally, in certain implementations such services can be services that can enable the retrieval of content (e.g., business names, addresses, phone numbers, etc.) that may enhance or otherwise be relevant to certain operations described herein. In certain implementations, such received content/information can be stored within content repository' 160 (thereby further enhancing the content stored therein).

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of server 140 and device 110 and are described in more detail in conjunction with FIGS. 2-6, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
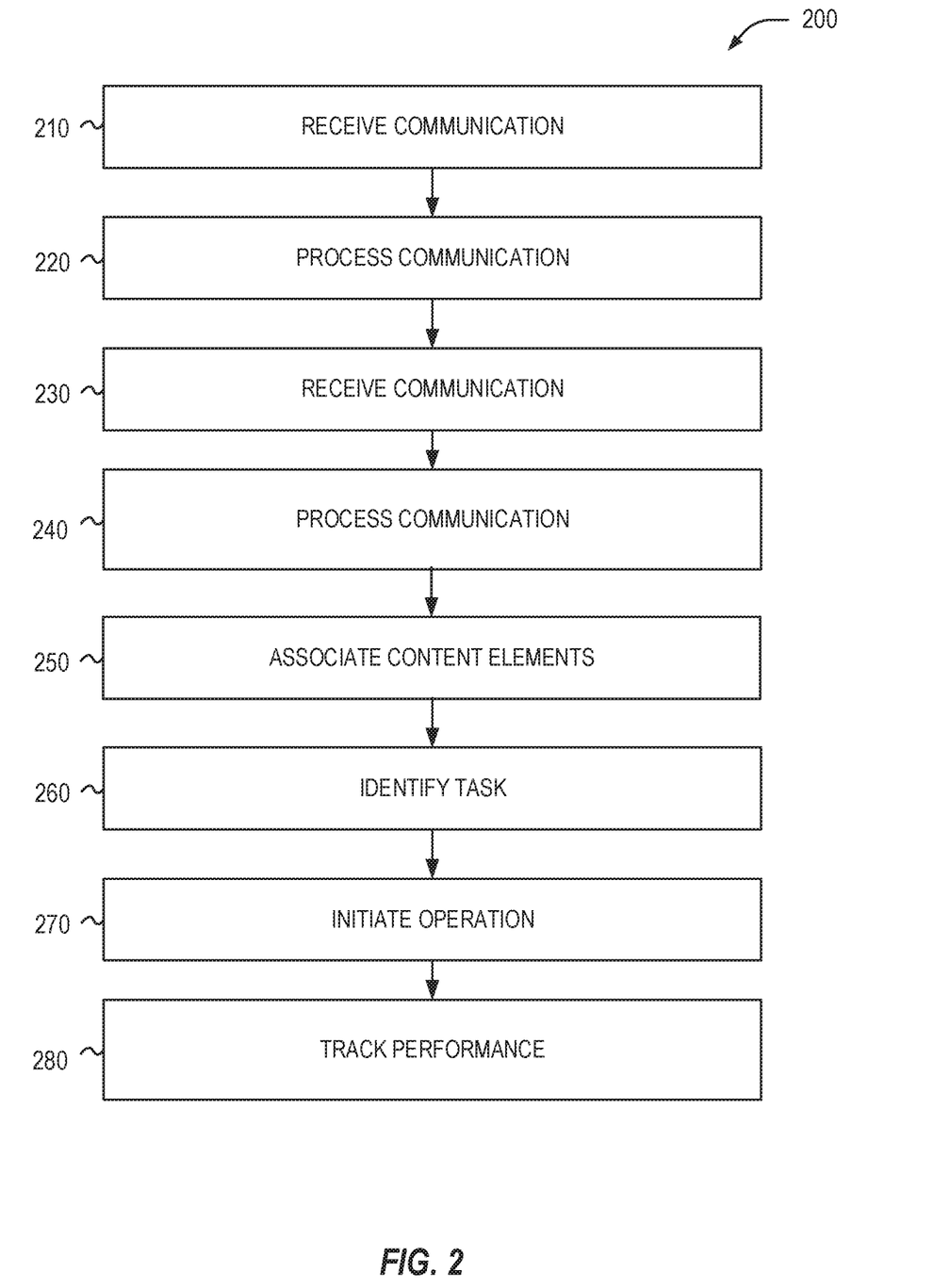
FIG. 2 is a flow chart illustrating a method, in accordance with an example embodiment, for task identification and tracking using shared conversational context.

FIG. 2 is a flow chart illustrating a method 200, according to an example embodiment, for task identification and tracking using shared conversational context. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a communication is received. In certain implementations, such a communication (e.g., a first communication) can originate/be received from a user (e.g., user 130A). Such a communication can be, for example, a message/transmission (e.g., as provided within a messaging/chat interface or any other such communication framework). Additionally, in certain implementations the referenced communication can be provided via/received from an application or service (e.g., an external service with respect to which user 130 is messaging or otherwise communicating with). Moreover, in certain implementations such a communication can be received within a communication session (e.g., a conversation or correspondence between the referenced user and other user(s)). In certain implementations, various aspects of operation 210 (as well as the other operations described with respect to FIG. 2) are performed by server 140 and/or content processing engine 142 (e.g., as depicted in FIG. 1). In other implementations, such aspects can be performed by one or more other elements/components, such as those described herein.

Figure 3A:
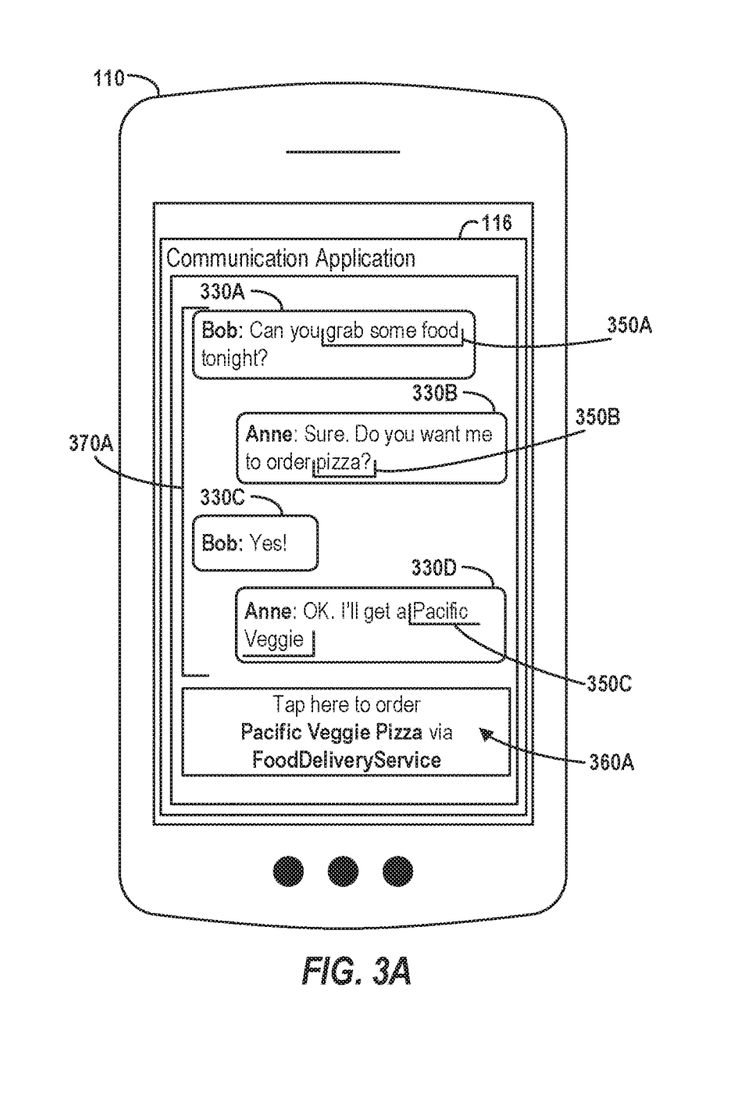
FIGS. 3A and 3B illustrate example scenarios described herein, according to an example embodiment.

By way of illustration, FIG. 3A depicts an example scenario in which communication application 116 is executing on device 110. As shown in FIG. 3A, user 130A (here, 'Bob') can provide/input communication/message 330A ("Can you grab . . . "). Such communication 330A can be transmitted to/received by server 140 and/or content processing engine 142.

At operation 220, the communication (e.g., the communication received at operation 210) is processed. In doing so, a content element (or multiple content elements) can be identified within or otherwise extracted from the communication. In certain implementations, such a content element can include but it not limited to an intent, an entity, or an action (and/or parameters; values of such elements). For example, with respect to FIG. 3A, communication/message 330A can be processed (e.g., by content processing engine 142) to identify or extract various content elements such as content element 350A ('grab some food' which corresponds to the intent 'order food').

At operation 230, a second communication is received. In certain implementations, such a communication can be received from a second user (e.g., a user other than the user from which the communication was received at operation 210). In other implementations, such a communication can be received from the first user (e.g., the user from which the communication was received at operation 210). Such a communication can also be received within a communication session (e.g., a conversation between the referenced users). Such a communication can be, for example, a message/transmission (e.g., as provided within a messaging/chat interface or any other such communication framework).

By way of illustration, as shown in FIG. 3A, user 130B (here, 'Anne') can provide/input communication/message 330B ("Sure . . . order pizza?"). Such communication 330B can be transmitted to/received by server 140 and/or content processing engine 142.

At operation 240, the second communication (e.g., the communication received at operation 230) is processed. In doing so, another content element (or multiple content elements) can be identified within or otherwise extracted from the communication. In certain implementations, such a content element can include but it not limited to an intent, an entity, or an action (and/or parameters/values of such elements). For example, with respect to FIG. 3A, communication/message 330B can be processed (e.g., by content processing engine 142) to identify or extract various content elements such as content element 350B ('pizza' which, for example, can further clarify or otherwise identify the intent 'order food' identified above at operation 220).

At operation 250, one content element (e.g., the content element identified at operation 220) is associated with another content element, (e.g., the content element identified at operation 240). In certain implementations, the associating of the referenced content elements can be performed based on/in conjunction with an ontology, schema, or model that defines relationships between elements within the content repository.

By way of illustration and with reference to FIG. 3A, content processing engine 142 can associate a content element 350A identified within communication 330A (the intent 'order food') with another content element 350B identified within communication 330B (the cuisine 'pizza'). In certain implementations, such content elements 350 can be associated within a knowledge base/conversational graph associated with a communication session (e.g., conversation) that includes such communications. For example, FIG. 3A depicts communication session 370A which includes communications 330A-330D.

In certain implementations, the above referenced operations can be performed multiple times, e.g., with respect to multiple communications within a communication session. For example, communication 330D ("OK . . . Pacific Veggie") can be processed in the manner described above, e.g., in order to identify or otherwise extract content element(s) from the communication (e.g., content element 350C). Additionally, in certain implementations such content element(s) can be identified using the various content elements (and/or relationships, etc., therebetween) as stored in content repository 160 (e.g., with respect to communication session 370A).

For example, as shown in FIG. 3A, communication 330D can be processed to identify/extract content element 350C ('Pacific Veggie'). Such content element can then be processed with respect to the knowledge base/conversational graph associated with communication session 370A. As noted above, such a conversational graph can include content elements such as the intent 'order food' and the cuisine 'pizza.' Accordingly, upon receiving communication 330D (e.g., within communication session 370A), the communication can be processed in relation to the conversational graph associated with that communication session. Being that the conversational graph for communication session 370A already reflects an association between 'order food' and 'pizza,' subsequent communication(s) (here, 'Pacific Veggie') can be processed based on such association(s)/relationship(s). In doing so, the referenced content element ('Pacific Veggie') (and/or its relevance, significance, etc.) can be more accurately identified, e.g., based on association(s) between other content elements within the same communication session (which can reflect a shared context for the referenced conversation). Accordingly, 'Pacific Veggie,' within the context of communication session 370A can be determined to be a parameter or selection associated with the cuisine/intent previously identified (e.g., a specific selection associated with an order for pizza).

It should be noted that the described technologies enable the referenced identification based on content elements originating from multiple users across multiple communications (e.g., within a communication session). Accordingly, the referenced determination (e.g., that 'Pacific Veggie' within communication 330D refers to is a type of pizza with respect to which a pizza delivery order is to be completed) is computed based upon multiple communications which originated from multiple parties within a conversation.

At operation 260, a task is identified (e.g., by task management engine 144 and/or server 140). In certain implementations, such a task is identified based on an association between various content elements (e.g., the content elements associated at operation 250). As noted above, the referenced tasks can be action items or activities to be performed or completed (e.g., by a user). For example, as described above, during conversation 370A (as shown in FIG. 3A), various content elements (e.g., content elements 350A, 350B, and 350C) can be identified and associated with one another (e.g., within a knowledge base/conversational graph). Based on such association(s), a task (e.g., to order a 'Pacific Veggie' pizza) can be identified. Additionally, as noted above, various parameters associated with the referenced task can also be identified (e.g., the type of pizza, here 'Pacific Veggie'). It should be understood that the referenced parameters are merely illustrative and that any number of additional parameters (e.g., size, toppings, etc.) can also be included.

Moreover, in certain implementations the referenced task can be identified based on various weights. Such weights can be associated with various user(s), such as the users participating in a particular communication session. That is, it can be appreciated that, in certain scenarios, it may be possible to identify multiple tasks with respect to content elements, etc., identified within a communication session. For example, in a scenario in which users are discussing purchasing food, some users may intend/prefer to complete such a task by ordering via a food delivery application/service, while other users may intend/prefer to go to a local store to purchase food.

Accordingly, in certain implementations various weight(s) can be associated with respective task(s). Such weights can be associated with a particular user (or users) and can reflect the likelihood, probability, etc., that a particular task is relevant to a particular user (e.g., as compared to other possible task(s)). For example, based on previous communications, tasks, etc., processed/managed by the described technologies, it can be determined that a particular user frequently orders food via a food delivery application/service. Accordingly, a weight associated with such a task can be incremented/increased. Subsequently, in a scenario in which such a task (ordering food via an application/service) is an option that can be identified with respect to a particular communication session, and the task is assigned to the referenced user, the referenced weight can indicate that the 'order food via an application' task should be selected with respect to the referenced user (based on the user's previous behavior).

At operation 270, an operation is initiated (e.g., by task management engine 144 and/or server 140). In certain implementations, such an operation is initiated with respect to a task (e.g., the task identified at operation 260). For example, in certain implementations a selectable item associated with the task (e.g., a button, link, etc.) can be provided. By way of illustration, FIG. 3A depicts selectable item 360A provided within communication application 116. Selectable item 360A can be a button, link, control, etc., that a user (e.g., user 130B—here, Anne) can interact with (e.g., tap, click, etc.). Upon selecting selectable item 360A various commands, instructions, etc., associated with the referenced task can be transmitted, e.g., to a third-party service 128A (here, 'FoodDeliveryService'). In certain implementations, such commands, etc., can be provided via an API associated with the referenced service and can reflect the various identified content elements, parameters, etc., identified within the communication session (here, an order for 'Pacific Veggie' pizza). Additionally, in certain implementations the referenced selectable item 360A can include a 'deep link' through which the user can activate another application or access the service with respect to the various identified elements, parameters, etc. In doing so, the described technologies can facilitate completion of the task that has been identified within the communication session.

Additionally, in certain implementations the referenced selectable item(s) can be provided with respect to the first communication session. For example, personal assistant engine 146 (as shown in FIG. 1) can generate and provide such content for presentation within communication application 116 (e.g., a chat/messaging application). By way of illustration, as shown in FIG. 3A, selectable item 360A can be provided (e.g., by personal assistant engine 146) to device 110, e.g., for presentation within an interface of communication application 116. As noted above, selection of selectable item 360A can enable the user to initiate/complete a corresponding transaction, order, etc. (e.g., with respect to service 128A).

Figure 3B:
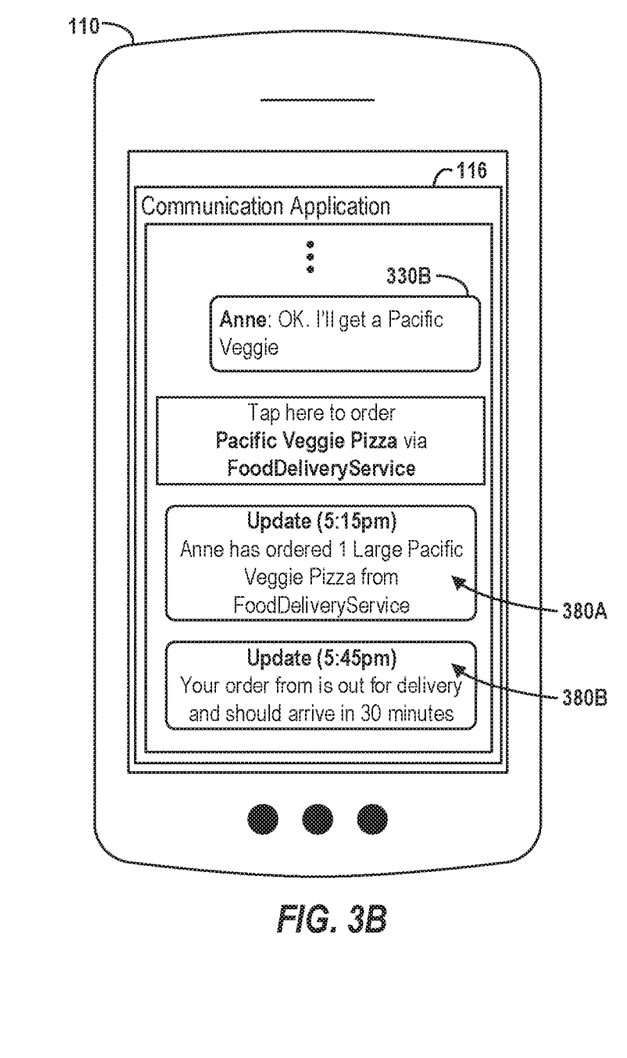

At operation 280, performance of a task (e.g., the task identified at operation 270) is tracked. In certain implementations, tracking such performance can include assigning the task to a user (e.g., a participant in the communication session within which the task is identified). For example, in certain implementations various notification(s) can be provided to various user(s) with respect to the task and/or its status. For example, FIG. 3B depicts a further example scenario in which communication application 116 is executing on device 110. As shown in FIG. 3B, various notifications 380A and 380B (collectively, notifications 380) can be provided within communication application 116. Such notifications 380 can reflect the status of a task, such as a task to order a 'Pacific Veggie' pizza, as identified within communication session 370 as described above. For example, notification 380A can reflect an update that the task has been performed by the assigned user (here, that Anne has ordered the referenced pizza). Further updates, such as notification 380B can also be provided, which further reflect various milestones, degrees of completion, etc., associated with the task (e.g., that the order is out for delivery).

Figure 4A:
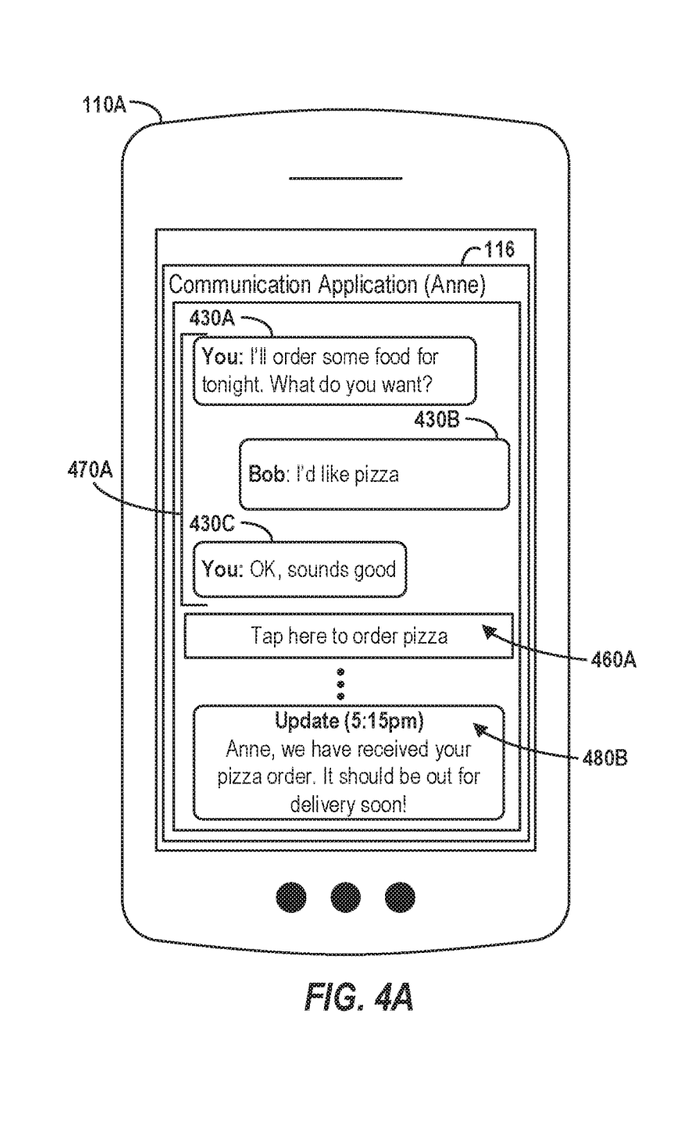
FIGS. 4A and 4B illustrate example scenarios described herein, according to an example embodiment.
Figure 4B:
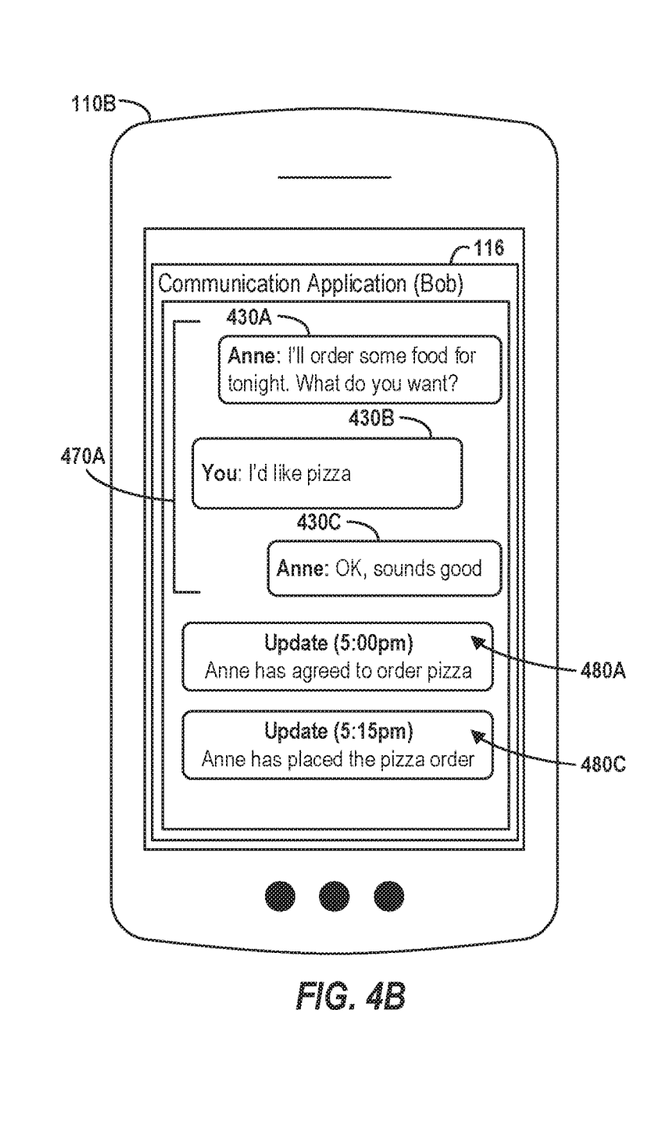

Moreover, in certain implementations various aspects of the performance of the assignment of a task and/or the tracking of such a task can be performed differently with respect to different users (e.g., different participants in a conversation). For example, FIG. 4A depicts an example scenario showing a communication session 470A between two users (Bob and Anne) as depicted at device 110A (here, the device being used by 'Anne'), while FIG. 4B depicts the same communication session as depicted at device 110B (here, the device being used by 'Bob'). As shown in FIG. 4A, based on the various communications 430A-430C, it can be determined that 'Anne' is to be assigned with the task of ordering pizza. Accordingly, selectable item 460A can be provided to device 110A, to enable the assigned user (here, Anne) to initiate/complete a corresponding transaction, order, etc. associated with the assigned task. (e.g., with respect to service 128A). In contrast, at device 110B (associated with user 'Bob,' to whom the task is not assigned) a notification 480A can be provided (e.g., in lieu of the referenced selectable item 460A provided at device 110A). Such a notification 480A can, for example, notify user 'Bob' that the referenced task (ordering pizza) has been assigned to user 'Anne.'

Subsequently, the assigned user (Anne, in the scenario depicted in FIGS. 4A and 4B) can perform or complete the assigned task. In such a scenario, respective notifications can also be generated and provided. For example, as shown in FIG. 4A, notification 480B can be generated and provided to Anne (confirming that the order she has placed has been received). In contrast, another user (here, Bob) to whom the task is not assigned, can be provided with another notification 480C that, for example, updates the user regarding the status of the order. In doing so, the described technologies can generate and provide selectable controls, options, updates, notifications, etc., that are appropriate/relevant to each respective user/participant within a conversation.

Figure 5A:
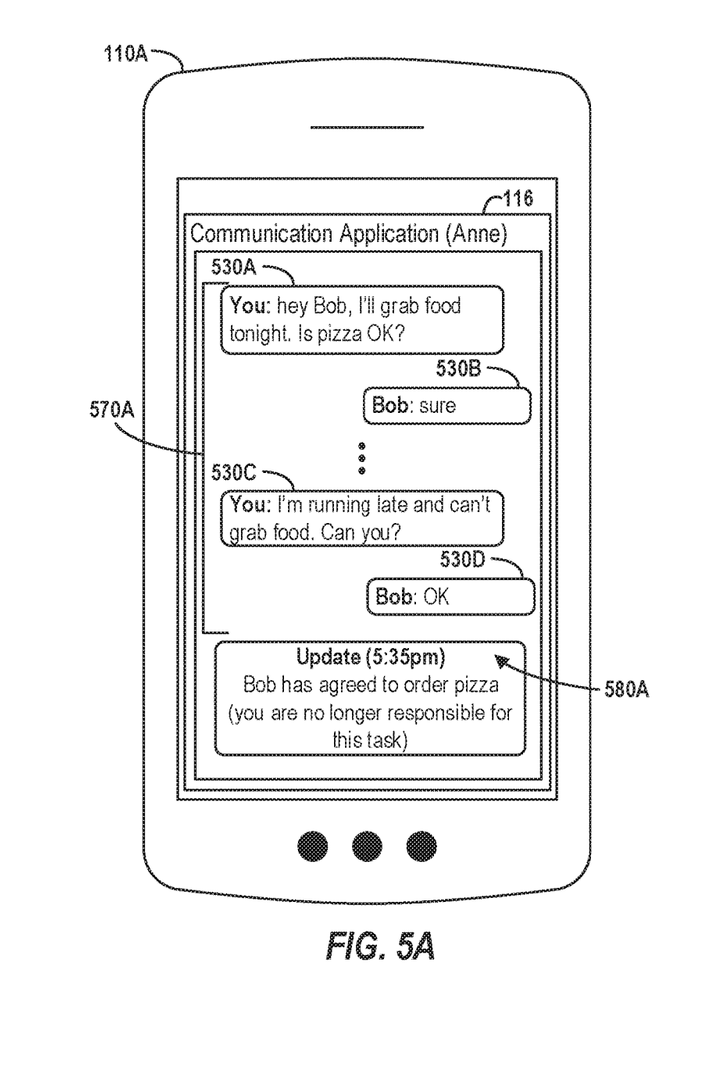
FIGS. 5A and 5B illustrate example scenarios described herein, according to an example embodiment.
Figure 5B:
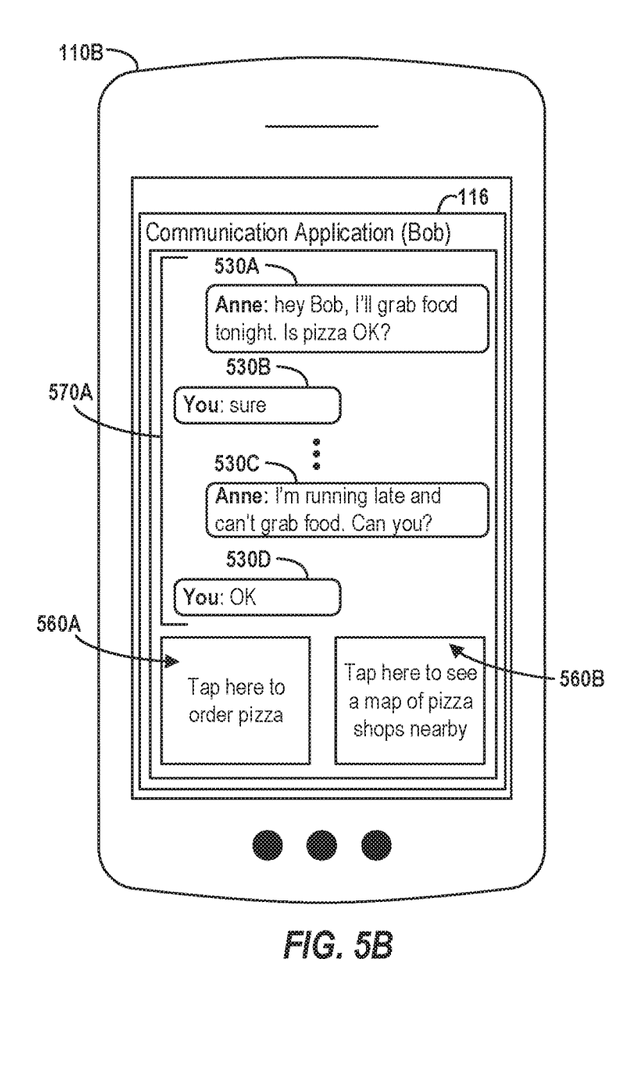

In certain implementations, though a task may be initially assigned to one user, in certain scenarios such task can be reassigned, e.g., to another user. By way of illustration, FIG. 5A depicts an example scenario showing a communication session 570A between two users (Bob and Anne) as depicted at device 110A (here, the device being used by 'Anne'), while FIG. 5B depicts the same communication session as depicted at device 110B (here, the device being used by 'Bob'). As shown in FIG. 5A, based on the various communications 530A-530B, it can be determined that 'Anne' is to be assigned with the task of ordering pizza. However, based on subsequent communications (e.g., communications 530C-530D), it may be necessary to adjust such assignment, e.g., by assigning the referenced task to another user (e.g., to Bob). Accordingly, as shown in FIG. 5B, though the referenced task (ordering pizza) was initially assigned to Anne, based on subsequent communications the task can be reassigned to another user (here, Bob).

Having reassigned the task to another user (here, Bob), a notification 580A can be provided to the previously assigned user (here, Anne), confirming that he/she is no longer responsible for the referenced task. Additionally, various selectable item(s) 560A and 560B can be provided to device 110B, to enable the newly assigned user (here, Bob) to initiate/complete various operations associated with the assigned task. For example, selectable item 560A can provide a link through which an order for pizza can be initiated/transmitted to a third-party service 128A, as described above. Additionally, selectable item 560B can provide a link through which the user can access/view a map of various nearby locations related to the referenced task (ordering pizza). In doing so, the user can be provided with various options which can facilitate completion of the task identified with respect to the communication session 570A. As noted above, the various content elements, parameters, etc., identified within the various communications included in the communication session can be accounted for/incorporated in facilitating the completion of such tasks. For example, as outlined in detail above, various options, parameters, etc., of an order that have been discussed during the conversation can be incorporated into an order that is placed (e.g., to a third-party service). It should be understood that the various services referenced herein are provided merely for the sake of illustration and that any number of other services can also be implemented in the manner described herein.

Additionally, though the scenario depicted in FIGS. 5A and 5B depicts the reassignment of a task based on subsequent communications (e.g., 530C and 530D) within the same communication session 570A, in other scenarios such reassignment can also occur based on subsequent communications within another communication session. For example, in the depicted scenario, after assigning the task to Anne, the users may stop communicating for a period of time, discuss another topic, etc. Subsequently, the users may resume a discussion of the referenced task (e.g., as reflected in communications 530C and 530D) in another communication session. Based on such communication(s) (e.g., those occurring within another communication sessions), the task can also be reassigned from one user to another.

It should also be noted that while the technologies described herein are illustrated primarily with respect to task identification and tracking using shared conversational context, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 6:
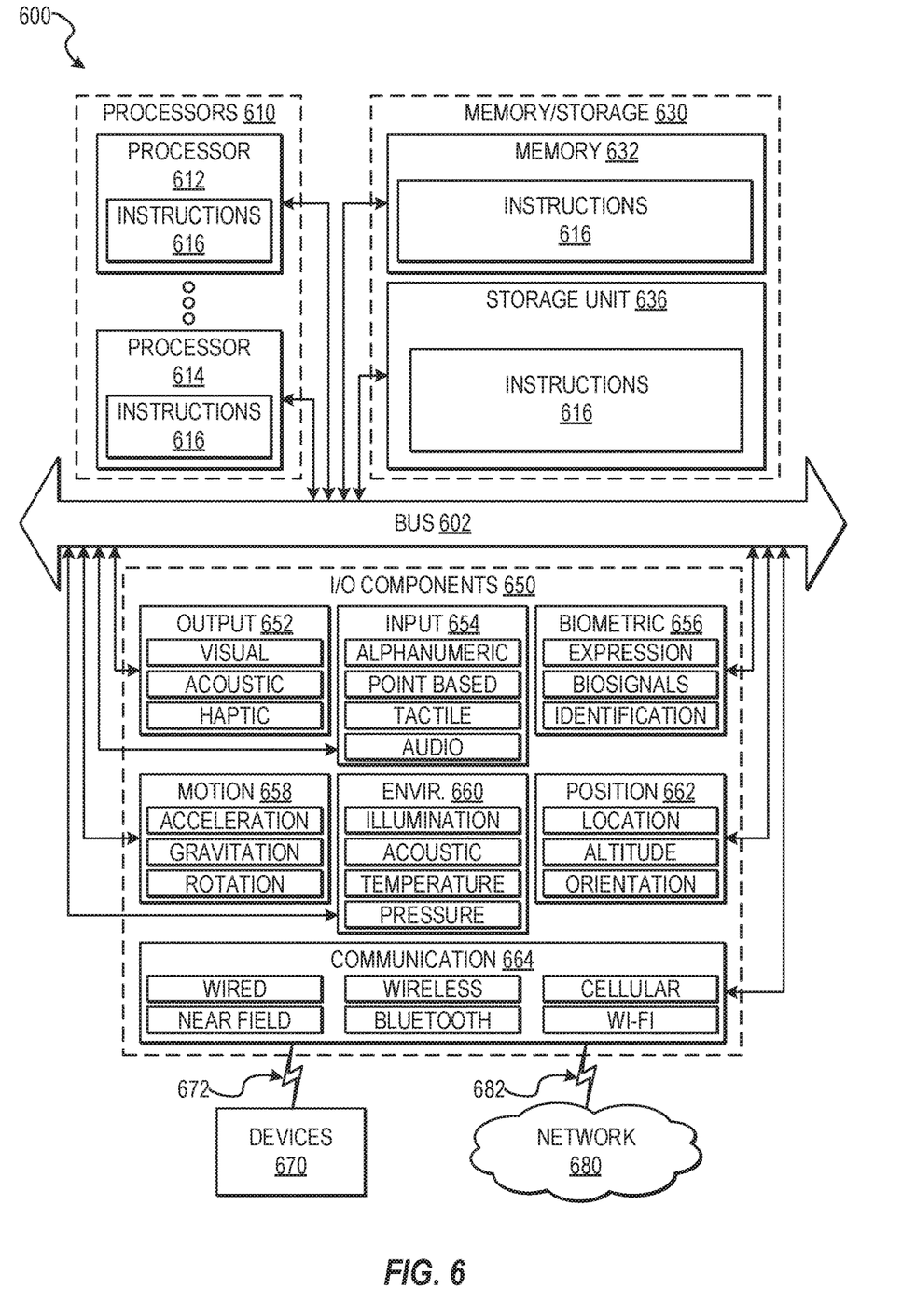
FIG. 6 is a block diagram illustrating components of a machine able to read instructions from a machine-readable medium and perform any of the methodologies discussed herein, according to an example embodiment.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the general, non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration. or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
one or more processors; and
one or more computer-storage media storing instructions that, when executed by the one or more processors, cause the system to perform operations that monitor electronic communications sent or received by a computing device over a network, the operations comprising:
receiving a first electronic communication sent through a communication application, wherein the first electronic communication is associated with a first user, wherein the first electronic communication is part of a conversation between the first user and a second user;
determining, using natural language processing, a first content element from the first electronic communication;
receiving a second electronic communication sent through the communication application, wherein the second electronic communication is associated with the second user, wherein the second electronic communication is part of the conversation;
determining, using natural language processing, a second content element from the second electronic communication;
storing the first content element with the second content element in a conversational graph that indicates, as a property of the conversational graph, a shared conversational context between the first content element and the second content element, wherein the shared conversation context means the first content element and the second content element originated in communications from the conversation;
determining, using natural language processing that takes the first content element, the second content element, and the shared conversational context as input, a task for the first user to perform;
presenting a task suggestion to the first user-with an interactive item;
receiving an interaction from the first user with the interactive item; and
in response to the interaction, communicating an activation message to a separate application or service, wherein the separate application or service assists the first user to complete the task.

2. The system of claim 1, wherein the second electronic communication is received from one of a second user device associated with the second user or a first user device associated with the first user.

3. The system of claim 1, wherein associating the first content element with the second content element comprises associating the first content element with the second content element based on a relationship between a first attribute of the first content element and a second attribute of the second content element.

4. The system of claim 1, wherein the operations further comprise identifying a parameter associated with the task.

5. The system of claim 4, wherein the parameter is determined from a third electronic communication.

6. The system of claim 1, wherein identifying the task comprises identifying the task based on a weight associated with the first user, the weight determined based on historical actions by the first user.

7. The system of claim 1, wherein the operations further comprise assigning the task to a first user.

8. The system of claim 7, wherein the operations further comprise reassigning the task from the first user to the second user.

9. The system of claim 8, wherein reassigning the task comprises reassigning the task based on a third electronic communication.

10. The system of claim 1, wherein the operations further comprise assigning the task to the second user.

11. The system of claim 1, wherein the task suggestion is caused to be presented as a notification within an electronic communications application from which the first electronic communication originated.

12. The system of claim 1, wherein the operations further comprise tracking performance of the task.

13. The system of claim 12, wherein the tracking performance of the task comprises providing a notification to the first user with respect to the task.

14. The system of claim 12, wherein the tracking performance of the task comprises providing a notification to the first user with respect to performance of the task by the second user.

15. A computer-implemented method that monitors communications sent or received by a computing device over a network, the method comprising:
receiving, by a computing system, a first electronic communication originating from a first application associated with a first user wherein the first electronic communication is part of a conversation between the first user and a second user;
determining, by the computing system and using natural language processing, a first content element from the first electronic communication;
receiving, by the computing system, a second electronic communication originating from a second application associated with the second user, wherein the second electronic communication is part of the conversation;
determining, by the computing system and using natural language processing, a second content element from the second electronic communication;
storing, by the computing system, the first content element with the second content element in a conversational graph that indicates, as a property of the conversational graph, a shared conversational context between the first content element and the second content element, wherein the shared conversation context means the first content element and the second content element originated in communications from the conversation;
determining, by the computing system, using natural language processing that takes the first content element, the second content element, and the shared conversational context as input, a task for the first user to perform;
presenting, by the computing system, a task suggestion to the first user with an interactive item;
receiving, by the computing system, an interaction from the first user with the interactive item; and
in response to the interaction, communicating, by the computing system, an activation message to a separate application or service, wherein the separate application or service assists the first user to complete the task.

16. The method of claim 15, further comprising tracking performance of the task by the first user.

17. The method of claim 16, wherein the tracking performance of the task comprises providing a notification to the first user with respect to the task.

18. The method of claim 16, further comprising reassigning the task from the first user to the second user based on a third communication.

19. A machine-readable medium having instructions stored thereon that, when executed by one or more processors, cause the one or more processors to perform operations that monitor communications sent or received by a computing device over a network, the operations comprising:
receiving, by a computing system, a first electronic communication over a network via an electronic communications application, wherein the first electronic communication is associated with a first user, wherein the first electronic communication is part of a conversation between the first user and a second user;
determining, by the computing system and using natural language processing, a first content element from the first electronic communication;
receiving, by the computing system, a second electronic communication over the network via the electronic communications application, wherein the second electronic communication is part of the conversation and is associated with the second user;
determining, by the computing system and using natural language processing, a second content element from the second electronic communication;
associating, by the computing system, the first content element with the second content element in a conversational graph that indicates, as a property of the conversational graph, a shared conversational context between the first user and the second user, wherein the shared conversation context means the first content element and the second content element originated in communications from the conversation;
determining, by the computing system, using natural language processing that takes the first content element, the second content element, and the shared conversational context as input, a task for the first user to perform;
presenting, by the computing system, through a graphical user interface of the electronic communications application, a task suggestion to the first user with an interactive item;
receiving, by the computing system, an interaction from the first user with the interactive item; and
in response to the interaction, communicating, by the computer, an activation message to an application on a first device associated with the first user, an application to help the first user complete the task.

20. The machine-readable medium of claim 19, wherein the instructions further comprise reassigning the task from the first user to the second user based on a third communication.

* * * * *